July 20, 1965

W. R. PHILLIPS 3,195,183

EXTRUSION DIES

Filed June 6, 1962

INVENTOR
Warren R. Phillips

BY

ATTORNEYS

July 20, 1965
W. R. PHILLIPS
3,195,183
EXTRUSION DIES
Filed June 6, 1962
2 Sheets-Sheet 2
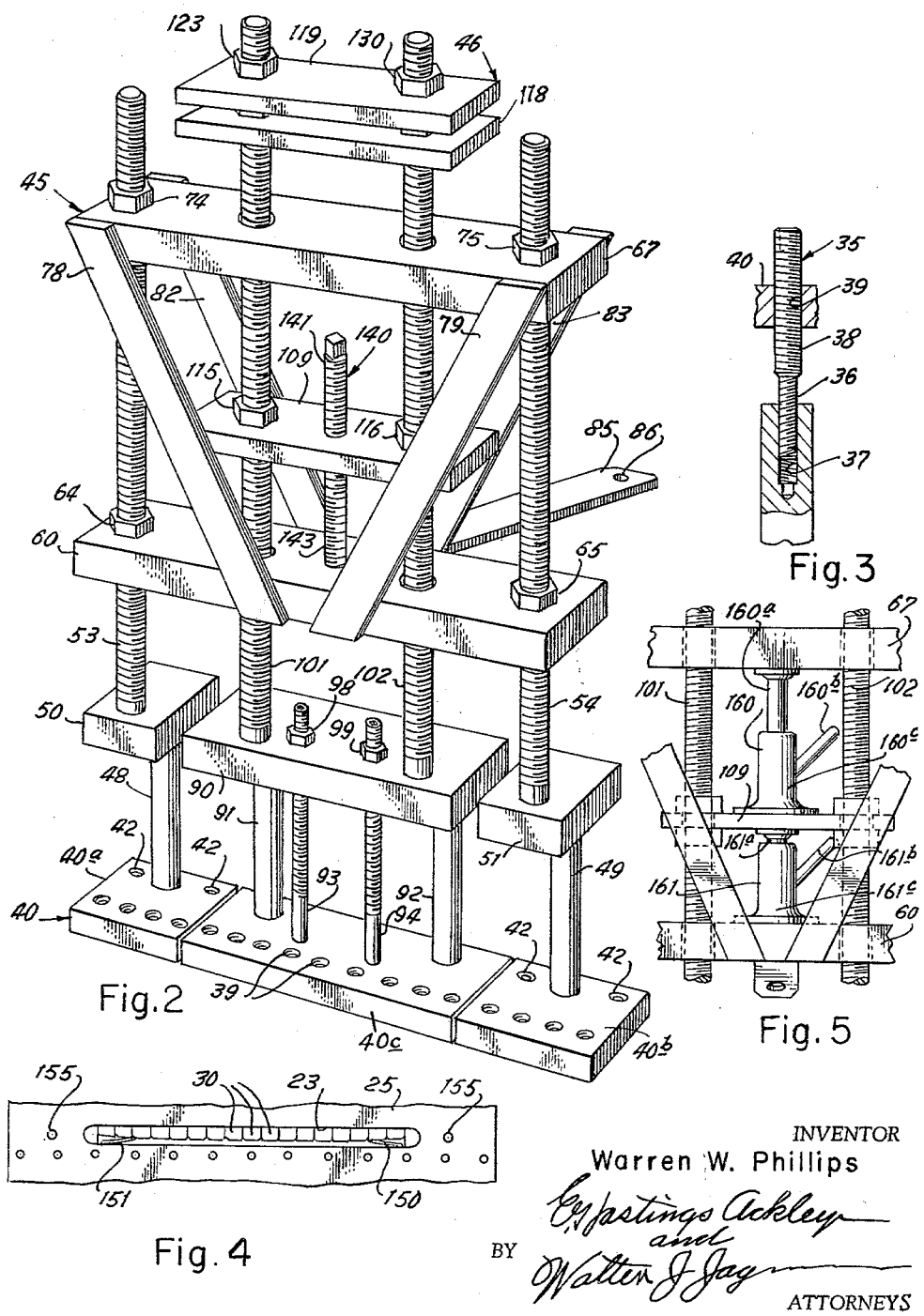
INVENTOR
Warren W. Phillips
BY
ATTORNEYS United States Patent Office 3,195,183
Patented July 20, 1965

3,195,183
EXTRUSION DIES
Warren R. Phillips, 5159 Yolanda Lane, Dallas, Tex.
Filed June 6, 1962, Ser. No. 200,390
8 Claims. (Cl. 18—12)

This invention relates to extrusion dies and more particularly to an adjustable extrusion die that can be utilized in extruding plastic materials.

Extrusion dies of the type illustrated in the patent to Ratliff, No. 2,720,679, October 18, 1955, are employed for such uses as to extrude recapping stock, formed of various types of rubber, adapted to be utilized in the recapping of worn tires. Because of the relatively large number of tire sizes and tread shapes for which recapping stock must be provided, such adjustable extrusion dies are provided with a plurality of adjustable die members adapted to be individually shifted with respect to one another in order that the thickness and the configuration of the strip of plastic material extruded past such die members may be changed or set. While the number of tire sizes and tread shapes is relatively great, a large percentage of the tires have the same tread width even though the thickness and configuration of the recapping stock having the same tread width may vary considerably. It is desirable therefore that the adjustable extrusion die be adjustable to provide for extruding the plastic material in strips of different widths, thicknesses and configurations and include a plurality of adjustable die members adapted to be individually shifted with respect to one another to form predetermined configurations in a strip of plastic material extruded past the die members and that it also have means for simultaneously adjusting a predetermined group of the die members as a unit which are utilized in the extrusion of the plastic strip of the most commonly used width, so that thickness of extruded strips of plastic material of such commonly used width may be quickly changed or adjusted by moving such group of adjustable die members while individual die members of the group should be individually adjustable relative to one another to permit changes in the configuration of such strip.

It is also desirable that the actuator for individually shifting or adjusting each die member accurately and positively position the die member without any loss of motion between the actuator and the die member and with relatively small movement of the actuator and will not permit movement of the die member relative to the actuator.

It is also desirable that the connection between such actuators and die members be of a type which minimizes wear of the actuator and of the die member at such connection which will cause such lost motion or permit undesired movement of the die member.

Accordingly, an object of this invention is to provide a new and improved adjustable extrusion die having die members which can be easily set to form a predetermined configuration in a strip of plastic material extruded past such die members.

Another object is to provide an adjustable die for extruding plastic material which includes a plurality of adjustable die members adapted to be individually shifted with respect to one another and means for shifting a group of die members as a unit to vary the thickness of the strip of plastic material extruded past such group of die members.

Still another object is to provide a new and improved actuator for actuating die members which is not susceptible to wear which may cause lost motion or permit relative movement of the die member relative to the actuator.

A further object is to provide a new and improved die member actuator having one portion threaded in a support bar and a second portion threaded in a bore of the die member, the two portions being threaded in opposite directions whereby rotation of the die actuator causes movement of the die member toward or away from the support bar.

A still further object is to provide a new and improved adjustable die having a plurality of die members mounted in alignment on an elongate support bar by means of die member actuators wherein the support bar is formed of a plurality of sections with one of the sections, on which a plurality of the actuators are movably mounted, being movable whereby the thickness of an extruded strip of predetermined width, whose configuration is determined by the relative positions of the die members mounted on the movable section, may be varied by moving the movable section.

Another object is to provide a new and improved means for adjusting the position of the movable section of the support bar.

Still another object is to provide a new and improved means mounted on the extrusion die apparatus providing for precise adjustment of the movable section of the support bar.

Additional objects and advantages of the invention will be readily apparent from the reading of the following description of a device constructed in accordance with the invention, and reference to the accompanying drawings thereof, wherein:

FIGURE 2 is a perspective view of the means for adjusting the position of the movable section of the support bar;

FIGURE 3 is a fragmentary, partly sectional view, showing a die member actuator embodying the invention;

FIGURE 4 is a fragmentary view showing the opening in a die support plate through which the plastic material is extruded past the die members of the adjustable die; and FIGURE 5 is a fragmentary plan view showing a modified form of the means for adjusting the movable section of the support bar.

Figure 1:
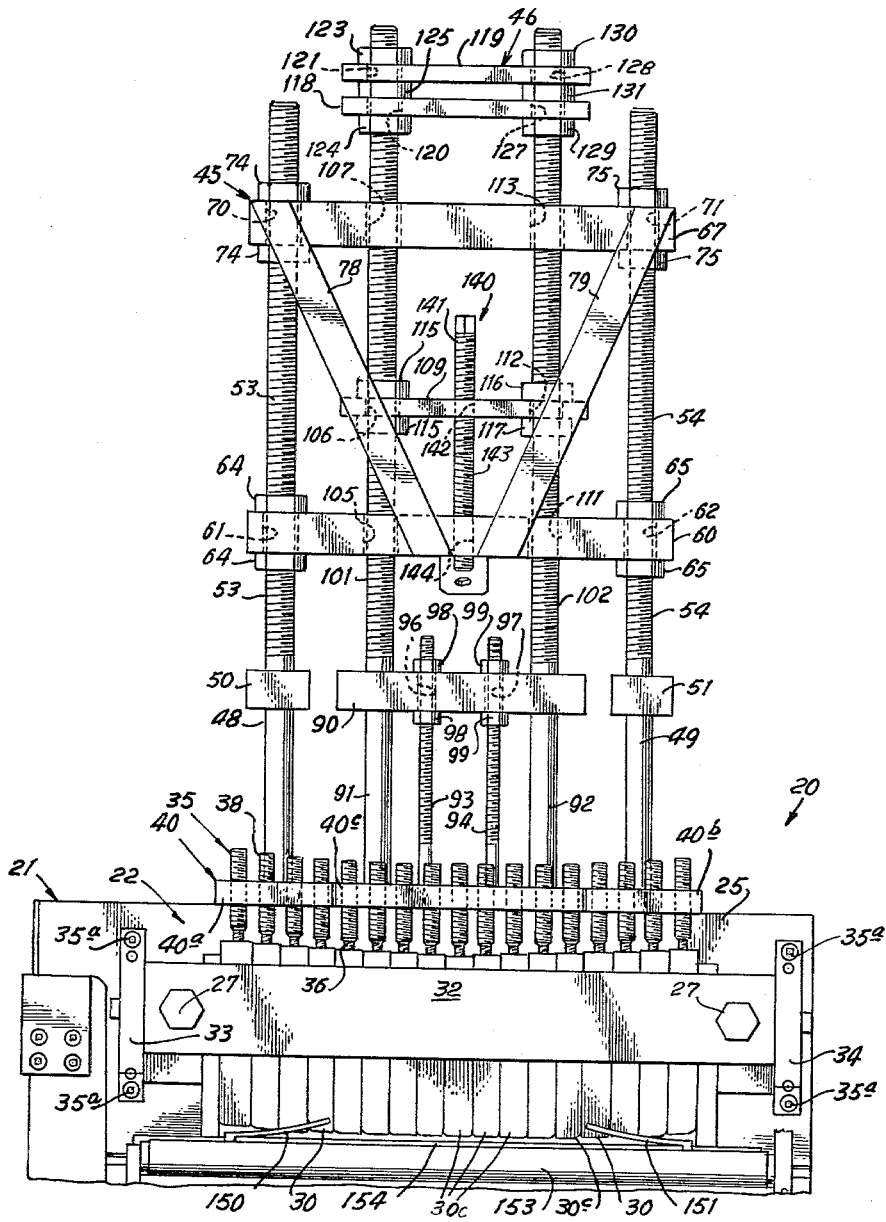
FIGURE 1 is a fragmentary front view of an extrusion apparatus provided with the adjustable extrusion die embodying the invention.

As is more fully explained in the patent to Ratliff, No. 2,720,679, the extrusion apparatus 20 includes a substantially rectangular frame 21 for securing the adjustable extrusion die 22 to the neck of a tubing machine, not shown, which urges the plastic material, in the present case a compounded rubber stock, through the neck of the machine to the opening 23 in the die supporting plate 25 of the adjustable die. The die supporting plate is connected to a mounting plate, not shown, by the bolts 27. The mounting plate in turn is secured to the neck of the tubing machine.

A plurality of die members or blades 30, are mounted in front of the die supporting plate 25 for vertical movement to traverse the transverse opening 23 in the die supporting frame 25 to alter the configuration of the upper half of the opening. The rear surfaces of the die members abut the front vertical surface of the die support plate and are held against forward outward movement relative to the die support plate by the bar 32 which abuts the front surfaces of the die members and which is secured to the die supporting frame 25 by means of the brackets 33 and 34 secured to the die supporting plate by the bolts 35a.

Each of the die members or blades 30 is supported by means of an actuator or screw 35 whose lower reduced end section 36 is receivable in the threaded bore 37 of the die member and whose upper enlarged threaded section 38 is received in a threaded bore 39 of an elongate support bar 40. The two sections 36 and 38 of each actuator are threaded in opposite directions so that rotation of the actuator in one direction will cause upward movement of the die member, since the die member cannot rotate due to its engagement with and position between the die supporting plate 25 and the transverse bar 32, and rotation of the actuator in the opposite direction will cause downward movement of the die member. It will be apparent that due to the provision of the oppositely threaded sections 36 and 38 of each actuator, the rotation of the actuator through a relatively small angle will cause a relatively large vertical movement of the die member supported thereby. In addition, the threaded engagement of the actuator with the die member provides relatively large areas of load bearing contact between the die member and the actuator to support the loads imposed by the pressure of the plastic as it is extruded past the die member. In addition, this large area of contact minimizes wear at the connection between the die member and the actuator and prevents movement or lost motion between the die member and the actuator.

The support bar has stationary end sections 40a and 40b and an intermediate movable section 40c. The stationary end portions 40a and 40b of the actuator support bar have rear portions which overlie the die supporting plate 25 and are rigidly secured thereto by suitable bolts, not shown, which extend through the apertures 42 of the stationary end sections into suitable threaded bores in the upper surface of the die supporting plate.

The movable section 40c of the support bar is supported for vertical movement on a frame 45 by means of the carriage 46. The frame 45 includes the columns 48 and 49 whose lower ends extend into suitable bores of the stationary sections 40a and 40b, respectively, and are rigidly secured thereto in any suitable manner, as by welding. Support blocks 50 and 51 are similarly rigidly secured to the upper ends of the support columns 48 and 49, respectively. The columns 48 and 49 are preferably positioned in vertical alignment with the die member supporting plate 25 and the support blocks extend forwardly over the stationary end portions of the support bar so that the threaded columns 53 and 54 rigidly secured to the support blocks 50 and 51, respectively, may have their longitudinal axes lying in the vertical plane in which are disposed the aligned vertical longitudinal axes of the threaded bores 39 of the actuator support bar 40. The lower ends of the threaded columns extend into upwardly opening suitable bore of the support blocks 50 and 51, respectively, in which they are rigidly secured in any suitable manner, as by welding.

An elongate bolster plate 60 of the frame is supported on the threaded columns which extend through suitable laterally spaced apertures 61 and 62 of the bolster plate, respectively. The bolster plate is rigidly held in any vertically adjusted position on the threaded columns against vertical movement in either direction by means of the nuts 64 and 65 threaded on the columns 53 and 54, respectively, and abutting upper and lower surfaces of the bolster plate. An upper frame plate 67 is similarly mounted on the threaded columns 53 and 54, which extend through the apertures 70 and 71, respectively of the upper plate, by means of the nuts 74 and 75 threaded on the rods 53 and 54, respectively, and abutting upper and lower surfaces of the upper plate. The bolster plate and the upper plate are connected at their forward sides by the rigid bracing straps 78 and 79 which extend convergently downwardly from opposite ends of the upper plate to the middle portion of the bolster plate and which are secured to the upper plate and the bolster plate in any suitable manner, as by welding. A similar pair of rigid bracing straps 82 and 83 similarly connect the rear sides of the upper plate and the bolster plate. A bracing bar 85 may have its forward end secured to the rear side of the bolster plate and have its rear end portion provided with an aperture 86 by means of which the bracing bar may be rigidly secured to a suitable rigid structure of the extrusion apparatus to help brace or hold the bolster plate against movement. It will be apparent that the frame 45 is very rigid due to this mounting of the upper plate and the bolster plate on the threaded columns and that the assembly of the bolster plate, the upper plate and their bracing straps is adjustably mounted on the threaded rods 53 and 54 by means of the nuts.

The carriage 46 includes a mounting plate 90 to which the movable section 40c of the support bar 40 is rigidly secured by the rear vertical columns 91 and 92 whose opposite end portions extend into suitable apertures in the mounting plate and in the movable section 40c and are rigidly secured thereto in any suitable manner, as by welding. The movable section of the support bar is also secured to the mounting plate 40 by means of the forward threaded connector rods 93 and 94 whose lower end portions are received in suitable apertures in the movable section and are rigidly secured thereto in any suitable manner, as by welding. The rods 93 and 94 extend through suitable apertures 96 and 97, respectively, in the mounting plate 90 and are secured thereto by means of the nuts 98 and 99 threaded on the forward rods 93 and 94, respectively, and abutting upper and lower surfaces of the mounting plate. The connector rods are disposed as close to the vertical plane in which lie the longitudinal axes of the threaded bores 39 of the movable section as is possible for a reason set forth below. The threaded rods are provided to cause the movable section 40c to be rigidly secured to the mounting plate 90 in exact parallel relationship therewith.

The vertical threaded columns 101 and 102 of the carriage have lower ends which extend into suitable upwardly opening bores in the mounting plate 90 and to which they are rigidly secured in any suitable manner, as by welding. The carriage rod 101 extends upwardly through suitable apertures 105, 106 and 107 of the bolster plate 60, a load plate 109 and the upper plate 67, respectively. The carriage rod 102 similarly extends through vertically aligned apertures 111, 112 and 113 of the bolster plate, the load plate and the upper plate. The load plate is secured in any vertically adjusted poistion on the carriage columns 101 and 102 by the nuts 115 and 116 threaded on the columns 101 and 102, respectively, which abut opposite sides of the load plate. The upper ends of the carriage columns are secured to one another by means of a pair of tie plates 118 and 119. The carriage rod 101 extends through suitable vertitcally aligned apertures 120 and 121 of the tie plates 118 and 119 and is secured thereto by the upper and lower nuts 123 and 124 which abut the lower and upper surfaces of the lower and upper tie plates, respectively, and by the intermediate nut 125 interposed between the tie plates. The carriage columns 102 similarly extends through vertically aligned apertures 127 and 128 of the lower and upper tie plates, respectively, and is rigidly secured thereto by the nuts 129 and 130 which abut the lower and upper surfaces of the lower and upper tie plates, respectively, and the intermediate nut 131 interposed between the two tie plates.

It will thus be seen that the carriage posts 101 and 102 are rigidly held in parallel vertical alignment since they are rigidly secured to one another at their lower ends by the mounting plate 90, at their upper end portions by the tie plates 118 and 119, and intermediate their ends by the load plate 109.

The carriage is adjustable vertically by means of the adjusting screw 140 whose upper section 141 is threaded in a suitable bore 142 of the load plate of the carriage and whose lower section 143 is threaded in the bore 144 of the bolster plate. The two sections 141 and 143 are threaded in opposite directions so that rotation of the carriage adjusting screw in one direction will cause upward movement of the carriage, and therefore of the movable section 40c, and rotation of the adjusting screw 140 in the opposite direction will cause downward movement of the carriage, and therefore of the movable section 40c.

It will be apparent that due to the provision of the oppositely threaded sections 141 and 143 of the carriage adjusting screw, the rotation of the adjusting screw through a relatively small angle will cause a relatively large vertical movement of the carriage. In addition, since the provision of the threaded engagement of the adjusting screw with the load plate and the bolster plate provides a relatively large area of contact between the adjusting screw and these plates enabling the adjusting screw to support the large loads imposed thereon by the pressure of the plastic as it is extruded past the die members 30. Furthermore, the relatively large contact areas provided by the threads of the screw with the threads of the load plate and the bolster plate minimizes wear thereof and thus minimizes any lost motion therebetween. The uppermost end portion of the carriage adjusting screw may be of square configuration so that it may be engaged by the usual socket wrench through which rotational movement may be imparted to the carriage adjusting screw.

Knives or cutters 150 and 151 of the extruding apparatus are disposed forwardly of the die members 30 to further shape or trim the extruded strip and to cut off surplus material at the sides thereof. A support roller 153 is also mounted on the extruding apparatus as is fully explained and illustrated in the patent to Ratliff.

In use, when it is desired to extrude a strip of plastic material of predetermined configuration, the plastic material is fed into the tubing machine and is forced or urged outwardly thereby through the transverse opening 23 in the die suporting plate 25 and between the lower ends of the die members 30 and the base bar 154 positioned in vertical alignment below the lower ends of the die members and secured to the die supporting frame by the bolts 155. The base bar defines the base of the strip of plastic material extruded while the lower ends of the die plates define or form the upper surface of the strip to cause it to have the desired cross-sectional or transverse configuration. Since each of the die members 30 is individually movable relative to the base bar 154 and to the transverse opening 23 of the die supporting plate 25, the upper surface of the strip of plastic material extruded may be made to have any desired configuration by adjustitng the vertical positions of the individual die members by rotating their actuators 35 in one direction or another. In the event that a very wide strip of material is to be extruded, the cutters 150 and 151 are of course moved to their extreme lateral outward positions relative to the transverse opening of the die plate 25. If the strip of plastic material, however, is of lesser width the cutters are moved inwardly toward one another as is fully explained in the patent to Ratliff, No. 2,720,679.

As was pointed out above, a large percentage of the recapping stock which, while varying greatly in transverse configuration and thickness, is of the same width and the configuration of the upper surface of such strip is determined by the die members carried or supported by the movable section 40c of the support bar 40. If it is therefore desired to change the thickness of such strip while maintaining constant its width, the movable section 40c of the support bar may be lowered or raised by rotation of the adjusting screw 140 which moves the carriage 46 upwardly or downwardly on the frame 45. Thus it is not necessary to rotate individual actuators of such blades 30c to change the thickness of the stock unless the configuration as well as the thickness of the strip is to be changed. In this event, after the movable section has been moved vertically to provide the desired change in the thickness of the strip, individual die members 30c are adjusted by rotation of their actuators through relatively small angles. As a result, the die may be easily and quickly adjusted to form strips of desired thickness and configuration with a minimum of expenditure of time and effort. If the section 40c were not movable but were integral with the stationary sections 40a and 40b of the support bar each time that the thickness of the strip of material had to be changed, even though its width remained constant, the position of each of the die members would have to be individually moved by rotation of its actuator 35.

It will thus be seen that by the provision of a movable section 40c of the support bar, a group of longitudinally aligned die blades or members 30c may be adjusted as a unit to vary the thickness of the strip of the plastic material extruded therepast.

It will further be seen that due to the provision of the actuators which are threaded in suitable bores in the support bar and in the upwardly opening bores 37 of the die members, each die member is moved a relatively large vertical distance upon the rotation of the actuator through a relatively small angle.

It will be further be seen that the movable section of the support plate is rigidly secured to a carriage mounted on a frame secured to any suitable rigid structure of the extruding apparatus so that the movable section may be held in precise desired alignment with the die plate and with the support bar.

The mounting of the assembly of the bolster plate and the upper plate and the bracing straps connecting these plates on the columns 53 and 54 of the frame by means of the nuts disposed on opposite sides of these plates threaded on these columns and disposed on opposite sides of these plates faciliates the precise alignment of the frame and precise horizontal disposition of the bolster plate and the upper plate thereon. Similarly, the mounting of the load plate and the tie plates on the threaded columns 101 and 102 of the carriage by means of the nuts threaded on these columns and abutting opposite sides of these plates similarly facilitates proper alignment and assemblage of the carriage plate on the frame and precise horizontal disposition of the load plate 109 and the mounting plate 90 so that any movement of the movable section 40c caused by the rotation of the adjusting screw will not change the horizontal disposition of the movable section.

If desired, as is illustrated in FIGURE 5, the vertical adjustment of the carriage relative to the frame 45 may be accomplished by a pair of jacks 160 and 161 instead of the adjusting screw 140. The jacks may be of any suitable type, such as of the hydraulic type having pistons 160a and 161a and operator levers 160b and 161b. It will be noted that the jack 160 has its base 160c resting on the load plate 109 of the carriage and the upper end of its piston abuts or bears against the lower surface of the upper plate 67 of the frame. The lower hydraulic jack similarly has its base 161c resting on the bolster plate 60 and the upper end of its piston 161 bears against the lower surface of the load plate 109.

It will thus be apparent that when it is desired to raise the carriage, and therefore the movable section 40c of the support bar, the operator levers 160 and 161b are operated to cause the piston 160a to move downwardly into the base 160c of the upper hydraulic jack and to cause the piston 161a to move upwardly relative to its base 161c. The pistons of the two jacks are of course locked against vertical movement relative to their bases when the carriage has been moved to the desired position on the frame so that the jacks thereafter prevent either upward or downward movement of the carriage on the frame.

It will now be apparent that the carriage is held rigidly by either the adjusting screw or the jacks against movement on the frame in either vertical direction in any adjusted position thereof and that similarly the die members are held by the actuators against movement in either vertical direction from their adjusted positions.

The foregoing description of the invention is explanatory only, and changes in the details of the construction

What is claimed and desired to be secured by Letters Patent is:

1. In a die for extruding plastic material: means providing an opening for the extrusion of a strip of plastic material therethrough; mounting means for holding a plurality of die members in edge to edge relation adjacent said opening to configure the top of such strips subsequent to its issuance from said opening, said mounting means including a movable section on which a group of said die members are mounted; and means for moving said movable section for simultaneously adjusting the position of said die members mounted on said movable section relative to said opening, said mounting means having actuator means for individually adjusting the position of each of said die members relative to said opening, said mounting means including a support bar having a plurality of aligned spaced threaded apertures, each of said die members having a threaded bore in one end thereof, each of said actuator means including a screw having one section threaded in a threaded aperture of said support bar and another section threaded in the bore of a die member, said sections of the screw being threaded in opposite directions whereby rotation of said screw in one direction moves its die member toward said support bar and rotation of said screw in a direction opposite said one direction moves its die member away from said support bar.

2. In a die for extruding plastic material: means providing an opening for the extrusion of a strip of plastic material therethrough; mounting means for holding a plurality of die members in edge to edge relation adjacent said opening to configure the top of such strip subsequent to its issuance from said opening, said mounting means including a support bar having a plurality of aligned spaced threaded apertures, each of said die members having a threaded bore in one end thereof, said mounting means including actuator means for individually adjusting the position of each of said die members relative to said opening, said actuator means including a screw having one section threaded in a threaded aperture of said support bar and another section threaded in the bore of a die member, said sections of the screw being threaded in opposite directions whereby rotation of said screw in one direction moves its die member toward said support bar and rotation of said screw in a direction opposite said one direction moves its die member away from said support bar.

3. In a die for extruding plastic material: means providing an opening for the extrusion of a strip of plastic material therethrough; mounting means for holding a plurality of die members in edge to edge relation adjacent said opening to configure the top of such strip subsequent to its issuance from said opening, said mounting means including a support bar having a plurality of aligned spaced threaded aperatures, said support bar including a pair of spaced end portions rigid with said means providing said opening and an intermediate section movable relative to said opening; means for moving said intermediate section relative to said opening, each of said die members having a threaded bore in one end thereof, said mounting means including actuator means for individually adjusting the position of each of said die members relative to said opening, said actuator means including a screw having one section threaded in a threaded aperture of said support bar and another section threaded in the bore of a die member, said sections of the screw being threaded in opposite directions whereby rotation of said screw in one direction moves its die member toward said support bar and rotation of said screw in a direction opposite said one direction moves its die member away from said support bar.

4. In a die for extruding plastic material: means providing an opening for the extrusion of a strip of plastic material therethrough; mounting means for holding a plurality of die members in edge to edge relation adjacent said opening to configure the top of such strip subsequent to its issuance from said opening, said mounting means including a support bar having a plurality of aligned spaced threaded apertures, said support bar including a pair of spaced end portions rigid with said means providing said opening and an intermediate section movable relative to said opening; means for moving said intermediate section relative to said opening, each of said die members having a threaded bore in one end thereof, said mounting means including actuator means for individually adjusting the position of each of said die members relative to said opening, said actuator means including a screw having one section threaded in a threaded aperture of said support bar and another section threaded in the bore of a die member, said sections of the screw being threaded in opposite directions whereby rotation of said screw in one direction moves its die member toward said support bar and rotation of said screw in a direction opposite said one direction moves its die member away from said support bar, said means for moving said movable section including a supporting frame rigid relative to said means providing said opening, a carriage movably mounted on said frame, and means connecting said carriage to said movable section.

5. In a die for extruding plastic material: means providing an opening for the extrusion of a strip of plastic material therethrough; mounting means for holding a plurality of die members in edge to edge relation adjacent said opening to configure the top of such strip subsequent to its issuance from said opening, said mounting means including a support bar having a plurality of aligned spaced threaded apertures, said support bar including a pair of spaced end sections rigid with said means providing said opening and an intermediate section movable relative to said opening; means for moving said intermediate section relative to said opening, each of said die members having a threaded bore in one end thereof, said mounting means including actuator means for individually adjusting the position of each of said die members relative to said opening, said actuator means including a screw having one section threaded in a threaded aperture of said support bar and another section threaded in the bore of a die member, said sections of the screw being threaded in opposite directions whereby rotation of said screw in one direction moves its die member toward said support bar and rotation of said screw in a direction opposite one direction moves its die member away from said support bar, said means for moving said movable section including a supporting frame rigid relative to said means providing said opening, a carriage movably mounted on said frame, and means connecting said carriage to said movable section; said supporting frame including a pair of parallel columns, means extending perpendicularly to said columns and adjacent opposite ends of said columns for rigidly securing opposite end portions of said columns to one another, and a bolster plate extending perpendicularly of said columns and rigidly secured thereto intermediate the ends thereof; said carriage including a pair of spaced columns parallel to said supporting frame columns and having one pair of adjacent ands rigidly secured to said movable section and having means extending perpendicularly to said columns and rigidly securing the other pair of adjacent ends to one another, and a load plate rigidly secured to said columns of said carriage intermediate the ends thereof and extending perpendicularly to said columns and parallel to said bolster plate; said means for moving said movable section comprising an adjustable screw having one section threaded in an aperture of said load plate and a second section threaded in an aperture of said bolster plate, said sections of said adjusting screw being threaded in opposite directions.

6. In a die for extruding plastic material: means providing an opening for the extrusion of a strip of plastic material therethrough; mounting means for holding a plurality of die members in edge to edge relation adjacent said opening to configure the top of such strip subsequent to its issuance from said opening, said mounting means including a support bar having a plurality of aligned spaced threaded apertures, said support bar including a pair of spaced end sections rigid with said means providing said opening and an intermediate section movable relative to said opening; means for moving said intermediate section relative to said opening, each of said die members having a threaded bore in one end thereof, said mounting means including actuator means for individually adjusting the position of each of said die members relative to said opening, said actuator means including a screw having one section threaded in a threaded aperture of said support bar and another section threaded in the bore of a die member, said sections of the screw being threaded in opposite directions whereby rotation of said screw in one direction moves its die member toward said support bar and rotation of said screw in a direction opposite said one direction moves its die member away from said support bar, said means for moving said movable section including a supporting frame rigid relative to said means providing said opening, a carriage movably mounted on said frame, and means connecting said carriage to said movable section; said supporting frame including a pair of parallel columns, means extending perpendicularly to said columns and adjacent opposite ends of said columns for rigidly securing opposite end portions of said columns to one another, and a bolster plate extending perpendicularly of said columns and rigidly secured thereto intermediate the ends thereof; said carriage including a pair of spaced columns parallel to said supporting frame columns and having one pair of adjacent ends rigidly secured to said movable section and having means extending perpendicularly to said columns and rigidly securing the other pair of adjacent ends to one another, and a load plate rigidly secured to said columns of said carriage intermediate the ends thereof and extending perpendicularly to said columns and parallel to said bolster plate; said means for moving said movable section comprising an adjusting screw having one section threaded in an aperture of said load plate and a second section threaded in an aperture of said bolster plate, said sections of said adjusting screw being threaded in opposite directions, said plates being rigidly secured to said columns by nuts threaded on said columns and abutting opposite opposed surfaces of said plates.

7. In a die for extruding plastic material: means providing an opening for the extrusion of a strip of plastic material therethrough; mounting means for holding a plurality of die members in edge to edge relation adjacent said opening to configure the top of such strip subsequent to its issuance from said opening, said mounting means including a support bar having a plurality of aligned spaced threaded apertures, said support bar including a pair of spaced end sections rigid with said means providing said opening and an intermediate section movable relative to said opening; means for moving said intermediate section relative to said opening, each of said die members having a threaded bore in one end thereof, said mounting means including actuator means for individually adjusting the position of each of said die members relative to said opening, said actuator means including a screw having one section threaded in a threaded aperture of said support bar and another section threaded in the bore of a die member, said sections of the screw being threaded in opposite directions whereby rotation of said screw in one direction moves its die member toward said support bar and rotation of said screw in a direction opposite said one direction moves its die member away from said support bar, said means for moving said movable section including a supporting frame rigid relative to said means providing said opening, a carriage movably mounted on said frame, and means connecting said carriage to said movable section; said supporting frame including a pair of parallel columns, means extending perpendicularly to said columns and adjacent opposite ends of said columns for rigidly securing opposite end portions of said columns to one another, and a bolster plate extending perpendicularly of said columns and rigidly secured thereto intermediate the ends thereof; said carriage including a pair of spaced columns parallel to said supporting frame columns and having one pair of adjacent ends rigidly secured to said movable section and having means extending perpendicularly to said columns and rigidly securing the other pair of adjacent ends to one another, and a load plate rigidly secured to said columns of said carriage intermediate the ends thereof and extending perpendicularly to said columns and parallel to said bolster plate; said means rigidly securing opposite end portions of said supporting frame including a connector plate, said load plate being disposed between said bolster plate and said connector plate; said means for moving said carriage including a pair of jacks, one of said jacks being interposed between and engaging said bolster plate and said load plate and the other of said jacks being interposed between and abutting said load plate and said connector plate.

8. In a die for extruding plastic material: means providing an opening for the extrusion of a strip of plastic material therethrough; a plurality of die members disposed in edge to edge relation adjacent said opening to configure the top of such strip subsequent to its issuance from said opening; mounting means for said die members including a support bar having a pair of spaced end portions rigid with said means providing said opening and an intermediate section movable relative to said opening, and actuator means connecting each of said die members to said support bar for moving said die members individually relative to said support bar and adjusting the position of each of said die members relative to said openings; and means for moving said intermediate section of said support bar relative to said opening, said means for moving said intermediate section including a supporting frame rigid relative to said means providing said opening, a carriage movably mounted on said frame, and means connecting said carriage to said intermediate section, said supporting frame including a pair of parallel columns, means extending perpendicularly to said columns and adjacent opposite ends of said columns for rigidly securing opposite end portions of said columns to one another, and a bolster plate extending perpendicularly of said columns and rigidly secured thereto intermediate the ends thereof; said carriage including a pair of spaced columns parallel to said supporting frame columns and having a pair of adjacent ends rigidly secured to said intermediate section of said support bar, a load plate rigidly secured to said columns intermediate the ends thereof and extending perpendicularly to said columns and parallel to said bolster plate, and means engageable with said load plate and said bolster plate for moving said load plate relative to said bolster plate.

References Cited by the Examiner

UNITED STATES PATENTS

| | | | |
|---|---|---|---|
| 2,216,533 | 10/40 | Kaplan. | |
| 2,410,888 | 11/46 | Lucy. | |
| 2,443,826 | 6/48 | Johnson | 18—44 X |
| 2,720,679 | 10/55 | Ratliff | 18—12 |

MICHAEL V. BRINDISI, *Primary Examiner.*

WILLIAM J. STEPHENSON, *Examiner.*